US010613418B2

(12) United States Patent
Tindall

(10) Patent No.: US 10,613,418 B2
(45) Date of Patent: Apr. 7, 2020

(54) PROXIMITY AND COLOR-BASED LIGHTING FOR CONTROLLED SUBJECT DISTORTION IN FILM AND PHOTOGRAPHY

(71) Applicant: John R. Tindall, Oak Park, CA (US)

(72) Inventor: John R. Tindall, Oak Park, CA (US)

( * ) Notice: Subject to any disclaimer, the term of this patent is extended or adjusted under 35 U.S.C. 154(b) by 21 days.

(21) Appl. No.: 15/975,093

(22) Filed: May 9, 2018

(65) Prior Publication Data
US 2019/0346745 A1    Nov. 14, 2019

(51) Int. Cl.
*G03B 15/06* (2006.01)
*G02F 1/1335* (2006.01)
*G03B 15/04* (2006.01)

(52) U.S. Cl.
CPC ....... *G03B 15/06* (2013.01); *G02F 1/133516* (2013.01); *G03B 15/04* (2013.01); *G03B 2215/0582* (2013.01)

(58) Field of Classification Search
USPC ................................ 396/4, 260; 362/3, 11
See application file for complete search history.

(56) References Cited

U.S. PATENT DOCUMENTS

| 6,824,283 B2 * | 11/2004 | Pohlert | G03B 15/02 362/11 |
| 7,764,451 B2 * | 7/2010 | Li | G02B 26/008 348/743 |
| 2016/0147132 A1 * | 5/2016 | Tindall | G03B 15/02 362/3 |

* cited by examiner

*Primary Examiner* — Clayton E. LaBalle
*Assistant Examiner* — Warren K Fenwick
(74) *Attorney, Agent, or Firm* — Stetina Brunda Garred and Brucker

(57) ABSTRACT

A method of selectively distorting a human face or other subject to be filmed or photographed includes providing a reflective or transmissive medium on which is formed a color pattern of two or more colors that produces white or gray by additive mixing, the color pattern consisting of a first set of one or more colors each of whose hue is ≥300 degrees or ≤120 degrees on a standard RGB color wheel and a second set of one or more colors each of whose hue is between 120 degrees and 300 degrees, the first set of colors confined to a contiguous region of the color pattern that makes up 50% or less by area. The method further includes positioning the medium relative to a light source and the subject such that light incident on the medium is reflected or transmitted by the medium and cast upon the subject.

27 Claims, 19 Drawing Sheets
(13 of 19 Drawing Sheet(s) Filed in Color)

PROXIMITY AND COLOR-BASED LIGHTING FOR CONTROLLED SUBJECT DISTORTION IN FILM AND PHOTOGRAPHY

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to lighting for film and photography, and more particularly, to the casting of light upon a subject such as a person's face.

2. Related Art

As a matter of physics, the colors that are perceived when viewing a film or photography subject (and thus the colors that may be captured) are limited by those colors that are present in the light incident on the subject. Therefore, in order to accurately represent the colors of a subject, it is generally understood that the subject should be illuminated with the full visible spectrum, i.e. white light. However, flat white light from "soft lights" or LED panel lights and other diffused light sources can often give a subject a flat, pasty, or sterile look, especially when used as a fill source outdoors. The shift in the industry from film to digital has made the problem even more pronounced.

BRIEF SUMMARY

The present disclosure contemplates various systems, methods, and devices for overcoming the above drawbacks accompanying the related art. One aspect of the embodiments of the present disclosure is a method of casting light upon a subject to be filmed or photographed. The method includes providing a reflective or transmissive medium on which is formed a color pattern of two or more colors that produces white or gray by additive mixing, the color pattern consisting of a first set of one or more colors each of whose hue is greater than or equal to 300 degrees or less than or equal to 120 degrees on a standard RGB color wheel and a second set of one or more colors each of whose hue is between 120 degrees and 300 degrees, the first set of one or more colors confined to a contiguous region of the color pattern that makes up 50% or less of the color pattern by area. The method further includes positioning the medium relative to a light source and the subject such that light from the light source incident on the medium is reflected or transmitted by the medium and cast upon the subject.

The contiguous region of the color pattern may make up 25% or less of the color pattern by area. The contiguous region of the color pattern may be a vertical stripe in a center of the color pattern. The contiguous region of the color pattern may be a T-shaped region including a horizontal stripe extending along an edge of the color pattern and a vertical stripe extending along a center of the color pattern. The contiguous region of the color pattern may be a pair of curves that meet in a center of the color pattern.

The first set of one or more colors may include two colors whose hues are separated by 60 degrees or more. The hues of the two colors of the first set of one or more colors may be separated by 90 degrees or more. The hues of the two colors of the first set of one or more colors may be separated by 120 degrees or more. The two colors of the first set of one or more colors may be arranged in an alternating pattern.

The reflective or transmissive medium may be a substrate and the color pattern may be formed on the substrate by printing. The positioning of the medium may include fixing the substrate to the light source, and the light from the light source incident on the substrate may be transmitted by the substrate. The method may further include positioning an umbrella reflector to reflect the light transmitted by the substrate to cast the light upon the subject. The light source may be the sun.

The reflective or transmissive medium may be a liquid crystal display screen and the color pattern may be formed on the liquid crystal display screen by selective transmission of light through red, green, and blue color filters of the liquid crystal display screen.

Another aspect of the embodiments of the present disclosure is a lighting system for casting light upon a subject to be filmed or photographed. The lighting system includes a reflective or transmissive medium on which is formed a color pattern of two or more colors that produces white or gray by additive mixing, the color pattern consisting of a first set of one or more colors each of whose hue is greater than or equal to 300 degrees or less than or equal to 120 degrees on a standard RGB color wheel and a second set of one or more colors each of whose hue is between 120 degrees and 300 degrees, the first set of one or more colors confined to a contiguous region of the color pattern that makes up 50% or less of the color pattern by area. The system further includes a light source positioned relative to the medium and the subject such that light from the light source incident on the medium is reflected or transmitted by the medium and cast upon the subject.

Another aspect of the embodiments of the present disclosure is a reflective or transmissive medium on which is formed a color pattern of two or more colors that produces white or gray by additive mixing, the color pattern consisting of a first set of one or more colors each of whose hue is greater than or equal to 300 degrees or less than or equal to 120 degrees on a standard RGB color wheel and a second set of one or more colors each of whose hue is between 120 degrees and 300 degrees, the first set of one or more colors confined to a contiguous region of the color pattern that makes up 50% or less of the color pattern by area.

The contiguous region of the color pattern may make up 25% or less of the color pattern by area.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features and advantages of the various embodiments disclosed herein will be better understood with respect to the following description and drawings, in which like numbers refer to like parts throughout, and in which.

DETAILED DESCRIPTION

The present disclosure encompasses various embodiments of systems, methods, and devices for casting light upon a subject to be filmed or photographed. The detailed description set forth below in connection with the appended drawings is intended as a description of the several presently contemplated embodiments of these methods, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
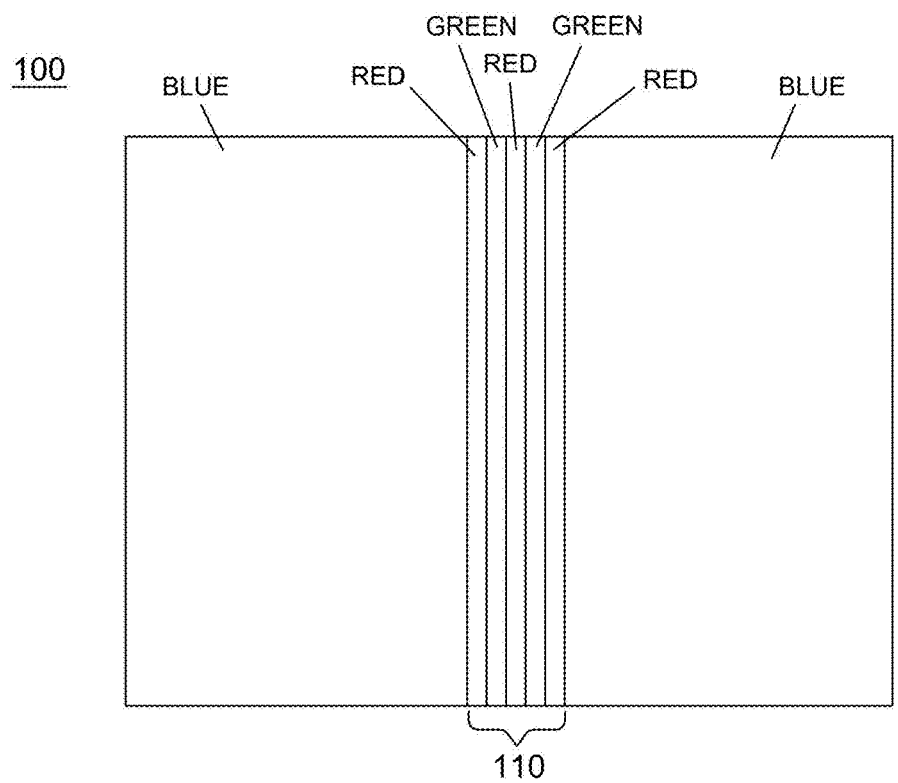
FIG. 1 shows a color pattern according to an embodiment of the present disclosure.
Figure 1A:
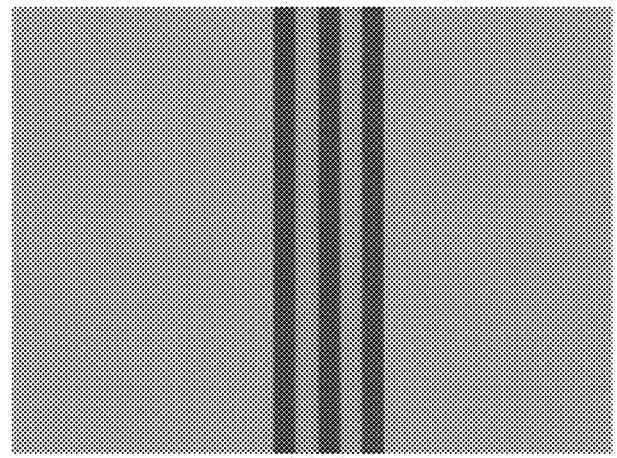
FIG. 1A is a color version of FIG. 1.

FIG. 1 shows a color pattern 100 according to an embodiment of the present disclosure. FIG. 1A is a color version of FIG. 1. The color pattern 100 may be used to reflect or transmit light from a light source onto a subject to be filmed or photographed. To this end, the color pattern may, for example, be printed on a substrate to be used as a filter that transmits light or as a bounce board that reflects light or may be formed on a liquid crystal display (LCD) screen through the use of red, green, and blue color filters of the LCD screen. The color pattern 100 may be a pattern of two or more colors that produces white or gray by additive mixing. In the simplest case, such a pattern may consist of red, green, and blue arranged in equal amounts (e.g. equal area) or, likewise, red and cyan arranged in equal amounts, green and magenta arranged in equal amounts, blue and yellow arranged in equal amounts, etc. where the individual colors have equal saturations and the additive mixture of all the colors has a saturation at or near zero. It is noted that such color patterns may in some cases produce gray rather than pure white, due, for example, to the use of darker shades. In more complex cases, such as that of the color pattern 100 shown in FIG. 1, the two or more colors may vary in saturation and be arranged in unequal amounts, with the additive mixture of all the colors still having a saturation at or near zero. In the example of FIG. 1, for example, the total area of blue is greater than the total area of red and green (and the total area of red is greater than the total area of green), but the color saturations of the red, blue, and green areas are selected (e.g. using neutral density pigments to lower saturation) such that, when considering the entire color pattern 100, the saturation is still at or near zero.

When such a color pattern as the color pattern 100 of FIG. 1 is used to transmit or reflect light from a light source, a flat subject at a predetermined distance from the color pattern 100 is illuminated with light of the same hue as the light source, or with white light in the case of a white light source, despite the fact that the color pattern 100 may consist of non-white colors. On a realistic subject, however, which may be a person's face having three-dimensional features such as eyes, nose, mouth, cheek bones, chin, tiny blemishes, etc., light transmitted or reflected by the component colors (e.g. red, green, blue) of the color pattern 100 strike different parts of the subject in different amounts due to partial blocking of light arriving from different angles. The overall effect may remain a perceptibly accurate (e.g. white light) illumination of the subject, while the slight variations in the color of the incident light across the subject may have the subtle effect of softening facial features and, in particular, hiding blemishes. Further description in relation to this aspect of the color pattern 100 can be found in U.S. Patent Application Pub. No. 2016/0147132, the entire contents of which are incorporated by reference herein.

Figure 2:
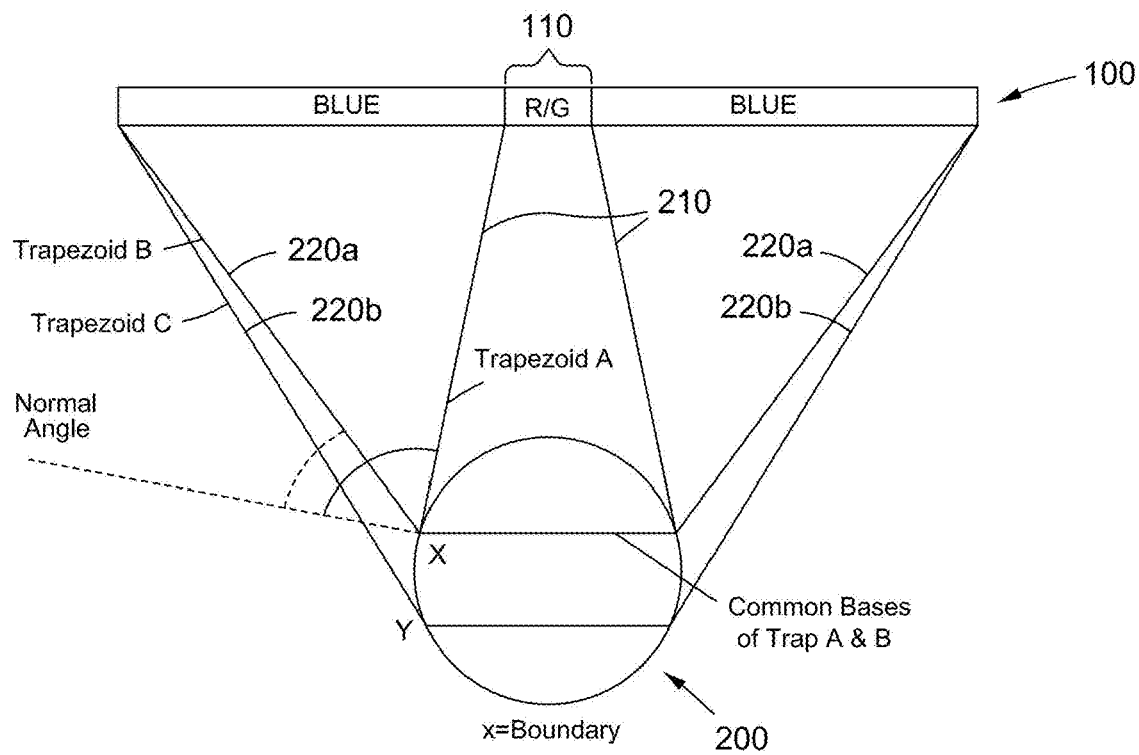
FIG. 2 is a schematic overhead view of the color pattern of FIG. 1 together with a spherical subject.

As noted above, the color pattern 100 is designed such that the total area of blue is greater than the total area of red and green. More particularly, the color pattern 100 may consist of a first set of one or more colors (e.g. red and green) each of whose hue is greater than or equal to 300 degrees or less than or equal to 120 degrees on a standard RGB color wheel and a second set of one or more colors (e.g. blue) each of whose hue is between 120 degrees and 300 degrees, the first set of one or more colors confined to a contiguous region 110 of the color pattern that makes up 50% or less of the color pattern 100 by area. Since certain colors are confined to the region 110, when the color pattern 100 is used to illuminate a multi-sided or curved three-dimensional subject, as opposed to a flat one as described above, there may be sides or portions of the subject that receive no light from those confined colors. This phenomenon is illustrated in FIG. 2, which is a schematic overhead view of the color pattern 100 together with a spherical subject 200. As can be seen, light rays 210 originating from the red/green region 110 of the color pattern 100 (either by transmission or reflection of light from a light source) illuminate only part of the subject 200, namely the part facing the color pattern 110 up to a boundary X (which is depicted as a line in FIG. 2 but can be understood as being a circular boundary in the case of a spherical subject). The same part of the subject 200 is also illuminated by light rays 220a originating from the blue regions of the color pattern 100, such that the entirety of the color pattern 100 illuminates this facing part of the subject 200 up to the boundary X. However, as can be seen in FIG. 2, the blue regions of the color pattern 100 extend farther out to the sides such that light rays 220b originating from the blue regions illuminate a larger facing part of the subject 200 up to the boundary Y. As a result, the sideways facing parts of the subject 200 between the boundaries X and Y are illuminated only by the light from the blue regions and not by the light from the red/green region 110.

Figure 3:
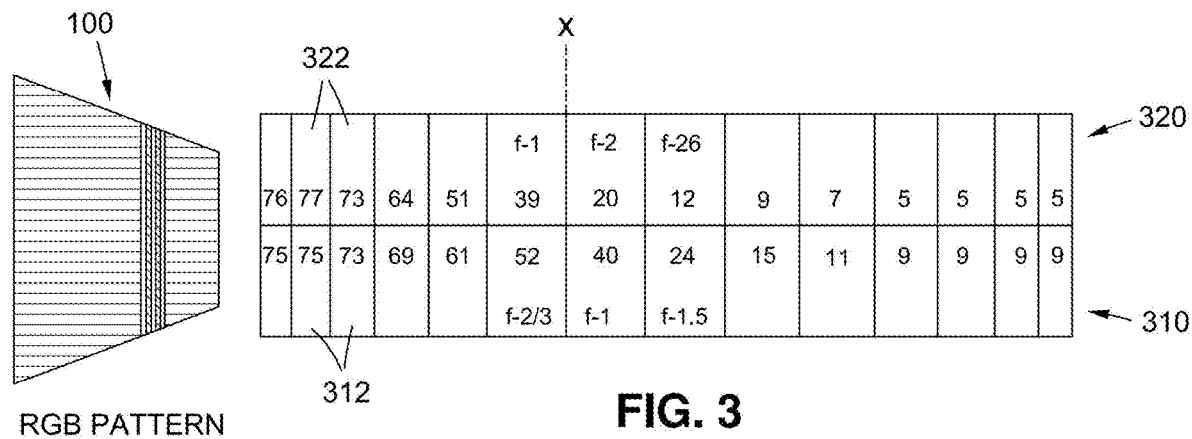
FIG. 3 is a side view of two roughly cylindrical slices taken from the center of respective spheres, a first slice taken from a white sphere and a second slice taken from a flesh-toned sphere.

FIG. 3 is a side view of two roughly cylindrical slices taken from the center of respective spheres, a first slice 310 taken from a white sphere (e.g. painted with a Lambertian white paint) and a second slice 320 taken from a flesh-toned sphere (e.g. covered with a standard mid flesh tone makeup foundation). Also shown schematically in FIG. 3 is a perspective view of the color pattern 100 of FIGS. 1 and 2, arranged so as to face the first and second slices 310, 320. Light from a light source (not shown) is transmitted or reflected by the color pattern 100 onto the first and second slices 310, 320 from the left side in FIG. 3.

The slices 310, 320 are divided into equally sized sectors 312, 322 as shown that extend all the way around each respective slice 310, 320. (The apparent gradual increase and decrease in size of the sectors 312, 322 is due to perspective, with the central sectors 312, 322 being in the foreground.) The numbers in each sector 312, 322 represent how brightly illuminated the sector 312, 322 is by the light transmitted or reflected by the color pattern 100. The specific values are density percentages as described below. Considering first the white slice 310, it can be seen that the values gradually decrease from 75, where the light from the color pattern 100 strikes the white slice 310 directly, down to 9, where the white slice 310 is facing completely away from the color pattern 100 and does not receive any light from it. In the case of the flesh-toned slice 320, the situation is similar with the following notable difference: At the position of the boundary X, where the light originating from the red/green region 110 no longer illuminates the slices 310, 320 (corresponding to the boundary X in FIG. 2), there is a dramatic falling off in values for the flesh-toned slice 320 (i.e. from 39 down to 20) that is not present in the case of the white slice 310 (i.e. from 52 down to 40).

The sudden change in illumination of the flesh-toned slice 320 at the boundary X is due to the fact that the flesh tone is largely absorbent of blue light, the flesh tone being itself a color chosen to match an average hue of a human face. Although the appearance of human skin varies greatly from very light complexion (Northern European) to very dark (African), the main distinction is the amount of the dark pigment melanin present in the skin. As a matter of hue, the color of skin does not vary by so much, with the average (>50%) exhibiting a hue between 5 and 25 degrees on a standard RGB color wheel based on samples of >250 sample faces of diverse ethnicity including >50 shades of professional makeup foundations (average 22 degrees) and 150 facial tones recognized by Pantone® (average 20 degrees) as being representative of human facial tones. Thus, past the boundary X, where the only light from the color pattern 100 that hits the flesh-toned slice 320 is from the blue regions of the color pattern 100, the total light reflected off the flesh-toned slice 320 is significantly lower. This effect can be observed as a more sudden shadowing of the flesh-toned slice 320 as compared to the white slice 310 as the slices 310, 320 curve away from the color pattern 100, resulting in the sudden drop off in values from 39 to 20.

Figure 3A:
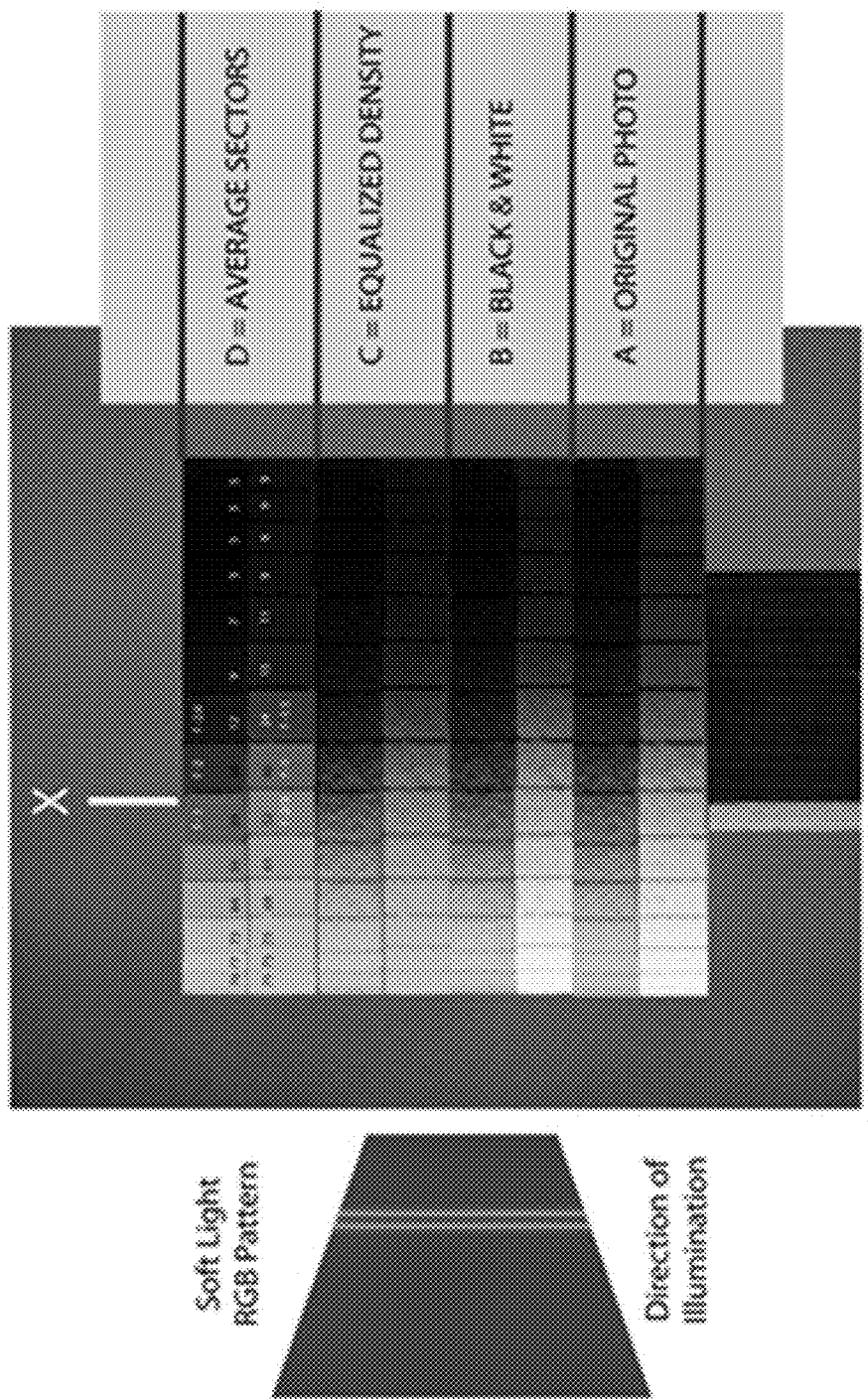
FIG. 3A is a color version of FIG. 3 additionally showing process iterations with respect to an original photograph.

FIG. 3A is a color version of FIG. 3 additionally showing process iterations with respect to an original photograph. The original photograph of the white slice 310 and flesh-toned slice 320 is shown as the bottom layer A in FIG. 3. The photograph is then manipulated using Adobe® Photoshop®. First, the photograph is changed to black-and-white as shown in layer B to analyze the luminance value without regard to hue. Then, neutral density is added to the white slice 310 to account for the difference in reflectance between the flesh tone makeup and the pure white Lambertian paint, in effect changing the white to an equivalent shade of gray as the flesh tone pigment to equalize highlights of the two slices 310, 320 as shown in layer C. Finally, as shown in layer D, the individual sectors 312, 322 are averaged to aid in density measurement and eliminate errors created by sampling a small area that might be affected by the texture of the surface. Measurements are taken using the Photoshop® color picker with the percentage in density indicated in each sector 312, 322.

Figure 4:
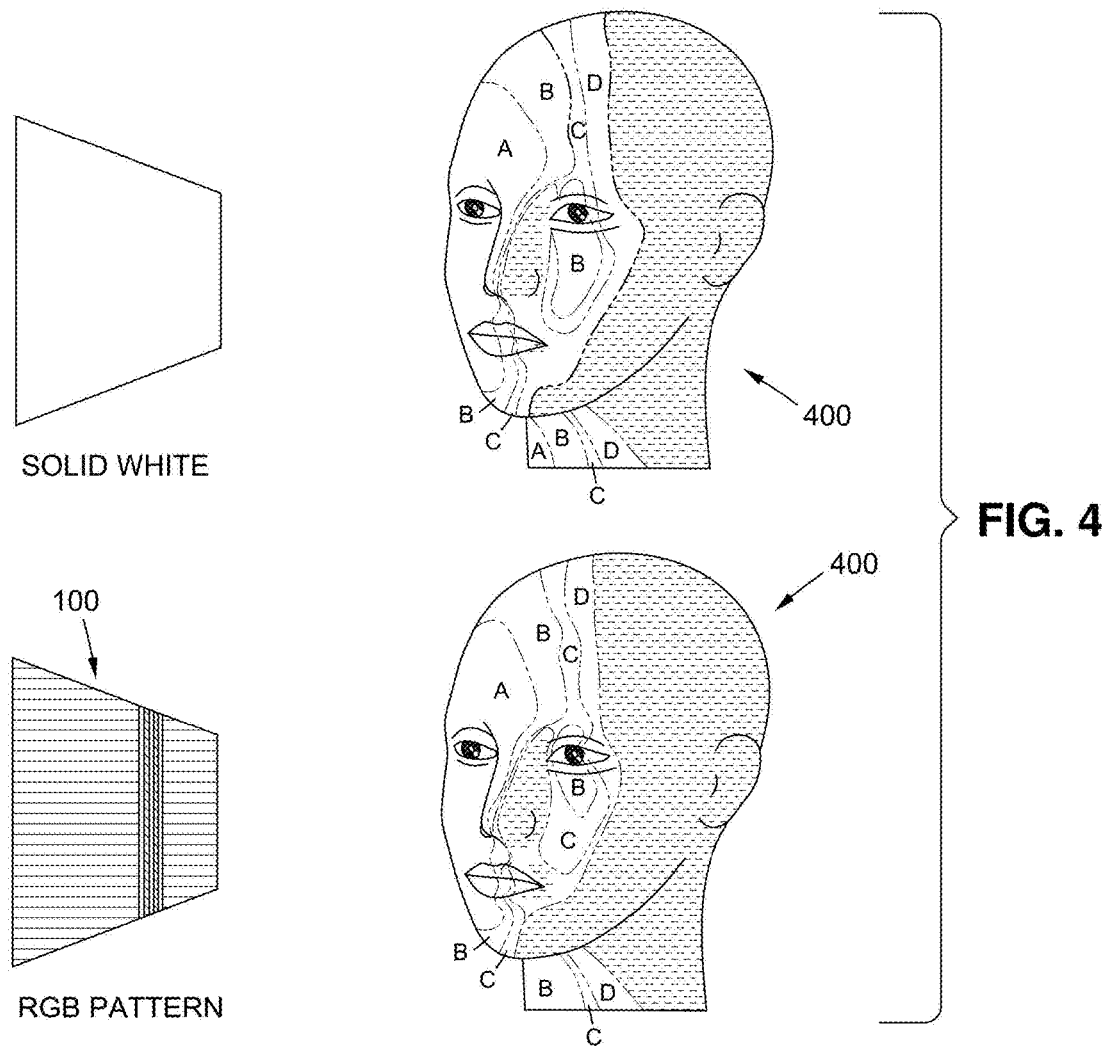
FIG. 4 shows a comparison between illumination of a flesh-toned human head analogue using a solid white substrate (upper part of FIG. 4) and illumination of the same head using the color pattern of FIG. 1 (lower part of FIG. 4)

FIG. 4 shows a comparison between illumination of a flesh-toned human head analogue 400 using a solid white light source such as a standard LED soft light (upper part of FIG. 4) and illumination of the same head 400 using the color pattern 100 with the same LED soft light (lower part of FIG. 4). As the light from the solid white light source or color pattern 100 falls on the head 400, the front part of the head 400 (about 30 degrees to the left of the center of the face in this example) is illuminated more brightly, with the side and back of the head 400 becoming more shadowed as the head 400 curves away from the light source. In FIG. 4, the images are posterized to divide the level of illumination into regions or isophotes of similar illumination A, B, C, and D in descending order of illumination, as well as a fifth, least illuminated region of dark shadow depicted by hatch marks. As can be seen, when the head 400 is illuminated by the color pattern 100, the drop-off in illumination is more pronounced, as the isophotes A, B, C, and D are narrower (i.e. the change in illumination occurs more abruptly) and the head 400 becomes completely shadowed more quickly as the head 400 curves away from the light source, creating the illusion of a more radical curve. Visually, this may have the effect of enhancing 3-D cueing, such that the three-dimensional shape of the head 400 is more apparent when captured on film or in a photograph (where human stereoscopic vision cannot be used to discern depth). In addition, the rapid drop-off in illumination may create the appearance of a smaller, thinner object to produce a "thinning" effect on the head 400 when illuminated by the color pattern 100 rather than solid white light, which may be desirable in the context of filming or photographing a person in a flattering way. If the contiguous region 110 of the color pattern makes up 25% or less of the color pattern 100 by area, such as 20% as shown in FIG. 1, the effects may be more pronounced.

Figure 4A:
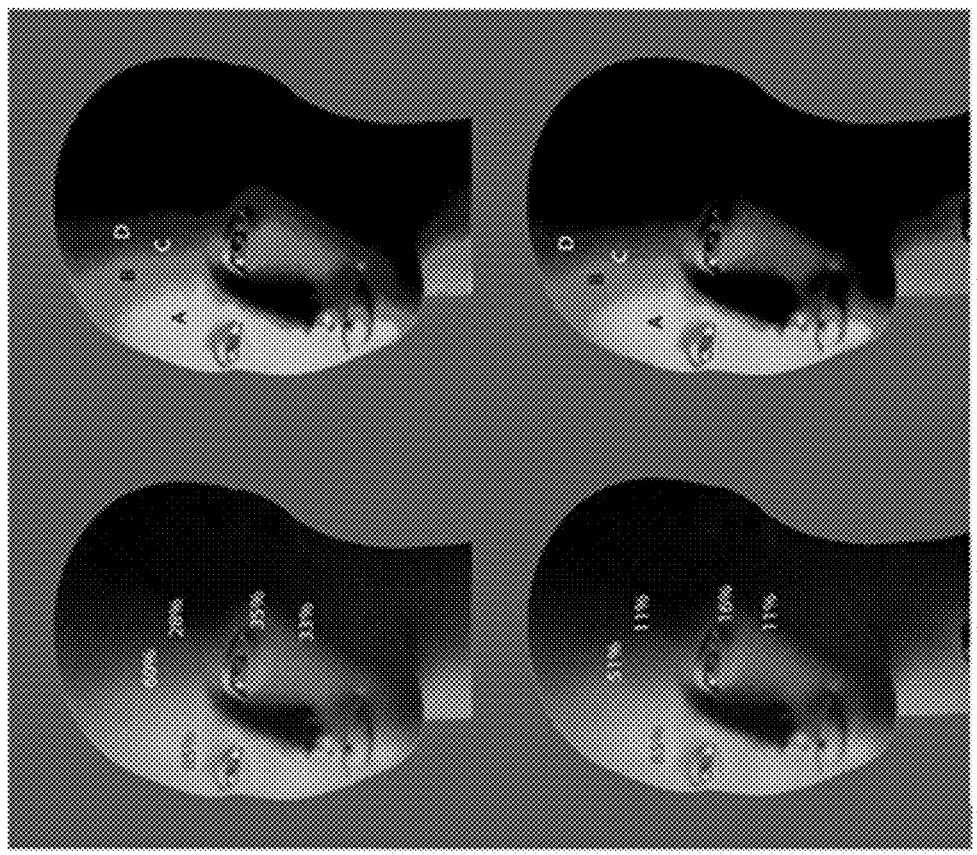
FIG. 4A is a color version of FIG. 4 additionally showing original images.
Figure 4A:
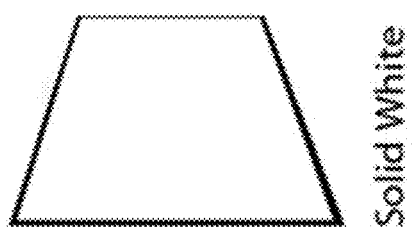
Figure 4A:
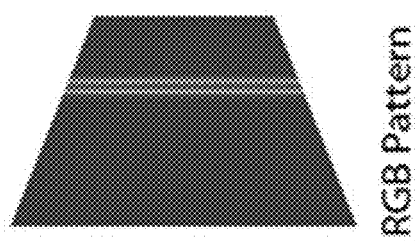

FIG. 4A is a color version of FIG. 4 additionally showing original images (left-hand side of FIG. 4A) prior to posterization. In the original images (left-hand side of FIG. 4A), luminance measurements are shown in density percentage as in FIG. 3.

Figure 4B:
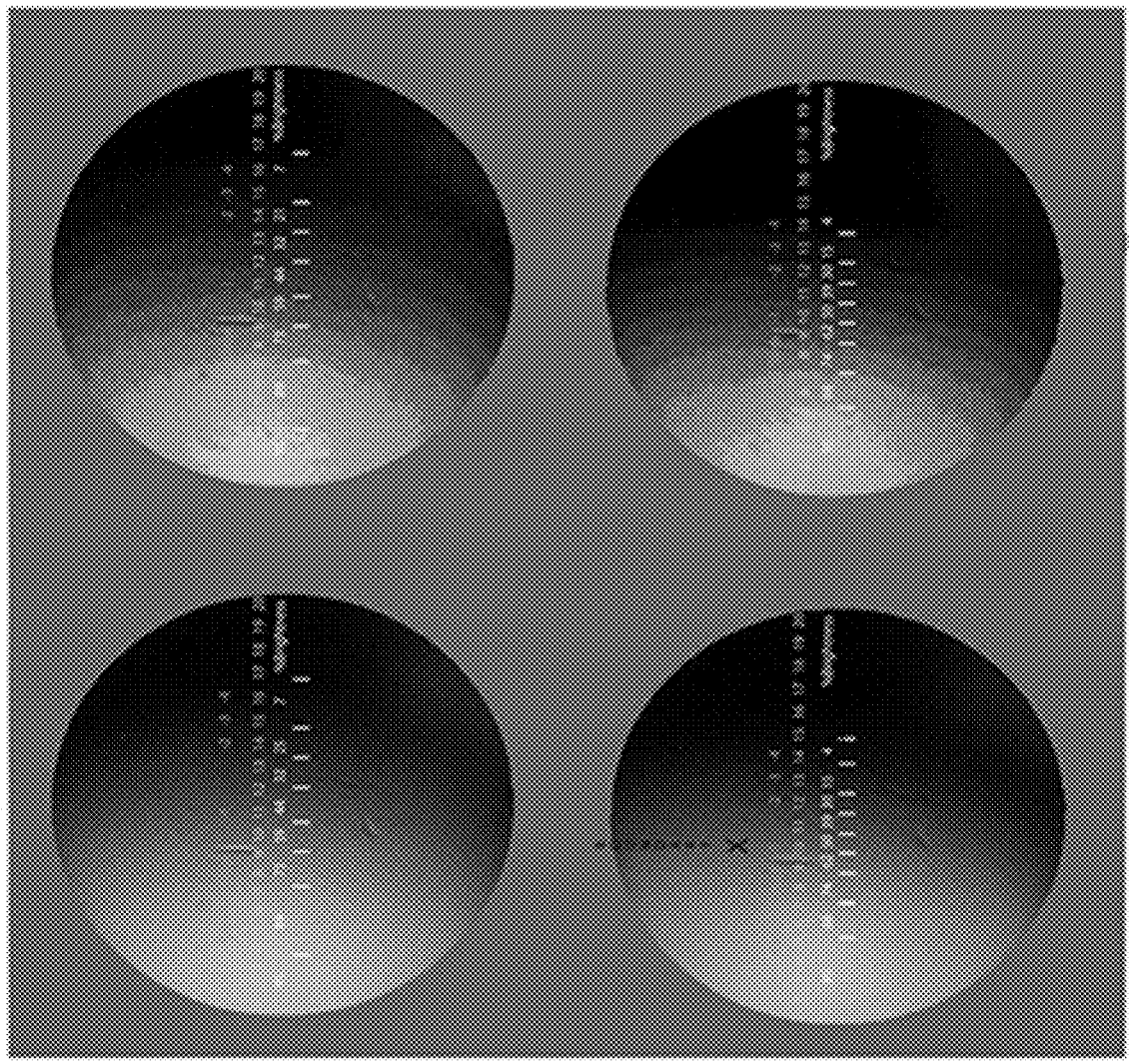
FIG. 4B is another example (color version only) that is the same as FIG. 4A except that a flesh-toned sphere is used instead of the flesh-toned human head analogue.

FIG. 4B is another example (color version only) that is the same as FIG. 4A except that a flesh-toned sphere is used instead of the flesh-toned human head analogue 400. In the example of FIG. 4B, the narrower, more compressed isophotes caused by the color pattern 100 can be seen in the lower-right image as compared to the upper-right image. As a result, the transition between highlight and shadow is much sharper, demonstrating how the contrast can be changed with a simple color pattern 100.

Figure 5:
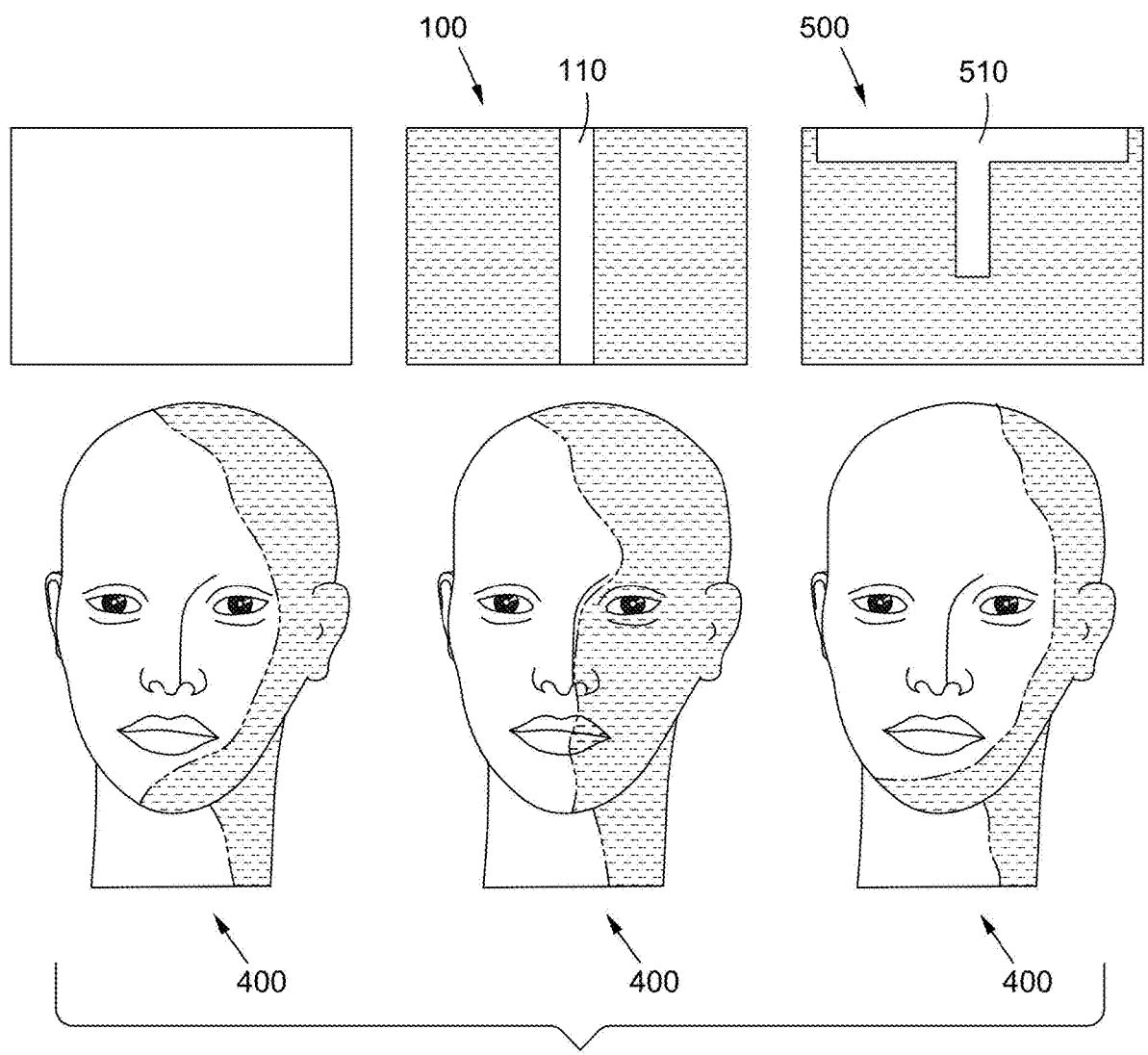
FIG. 5 shows a comparison between illumination of the flesh-toned human head analogue using a solid white substrate (left-hand part of FIG. 5), illumination of the same head using the color pattern of FIG. 1 (middle part of FIG. 5), and illumination of the same head using a modified color pattern.

FIG. 5 shows a comparison between illumination of the flesh-toned human head analogue 400 using a solid white light source (left-hand part of FIG. 5), illumination of the same head 400 using the color pattern 100 (middle part of FIG. 5), and illumination of the same head 400 using a modified color pattern 500. The color pattern 500 may be the same as the color pattern 100 shown in FIG. 1 including a contiguous region 510 to which certain colors (e.g. skin-tone colors) are confined that is the same as the contiguous region 110 except that, in the case of the color pattern 500, the contiguous region 510 is a T-shaped region including a horizontal stripe 510*a* extending along an edge of the color pattern 500 and a vertical stripe 510*b* extending along a center of the color pattern 500. In the example of FIG. 5, the horizontal stripe 510*a* of the contiguous region 510 extends along the upper edge of the color pattern 500 and the vertical stripe 510*b* extends along the center of the color pattern 500 in the upper half of the color pattern 500. Similar to FIG. 4, the solid white light source, color pattern 100, and color pattern 500 are assumed to be positioned in front of the head 400 (e.g. about 30 degrees to the left of the center of the face in this example). As the light from the solid white light source, color pattern 100, or color pattern 500 falls on the head 400, the front part of the head 400 is illuminated more brightly, with the side and back of the head 400 becoming more shadowed as the head 400 curves away from the light source. For simplicity, the level of illumination is divided into only two regions or isophotes in FIG. 5.

As can be seen from a comparison of the left-hand part of FIG. 5 with the middle part of FIG. 5 (and as demonstrated in more detail in FIG. 4), the contiguous region 110 of the color pattern 100 causes the illumination of the head 400 to drop off more quickly than in the case of the solid white light source. As noted above, this may have a thinning effect on the head 400, which may be desirable in the case of a real person's face. Turning to the right-hand part of FIG. 5, it can be seen that the color pattern 500 with the T-shaped contiguous region 510 causes the illumination of the head 400 to drop off more quickly in the downward direction toward the bottom of the head 400 (since the vertical stripe 510*b* of the contiguous region 510 doesn't extend to the bottom of the color pattern 500), which may have the further effect of deemphasizing the chin. Meanwhile, due to the horizontal stripe 510*a*, the T-shaped contiguous region 510 causes the illumination of the head 400 to drop off more gradually in the upward direction toward the top of the head 400, which may have the effective of emphasizing the forehead and giving dominance to the upper part of the face. In this way, the shape, size, and position of the contiguous region 110, 510 (where certain colors such as skin-tone colors may be confined as described above) can be chosen to selectively morph or distort the shape of a subject. Such effects can be used not only to create a "thinner" look but various other purposes as well, such as correcting for asymmetric faces, correcting for distortion created from either too high or too low lens height (e.g. keystone effect), etc. Depending on the medium of the color pattern (described in more detail below), the color pattern may in some cases be changeable on the fly via an electronic control system such as a computer, smart phone, tablet, etc., allowing the pattern to be optimized for a given face and/or for a given proximity of the subject to the color pattern or lighting source.

Figure 6A:
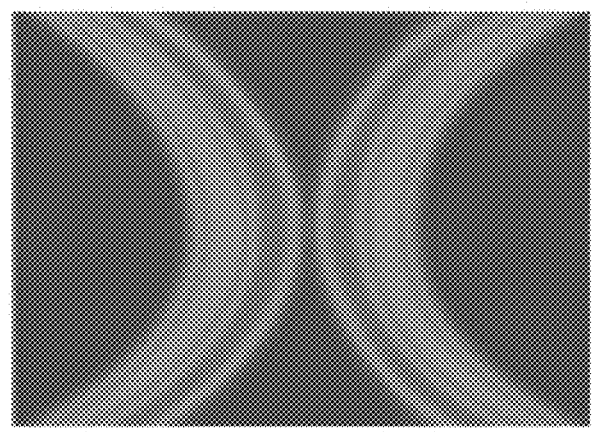
FIG. 6A is a color version of FIG. 6.
Figure 6:
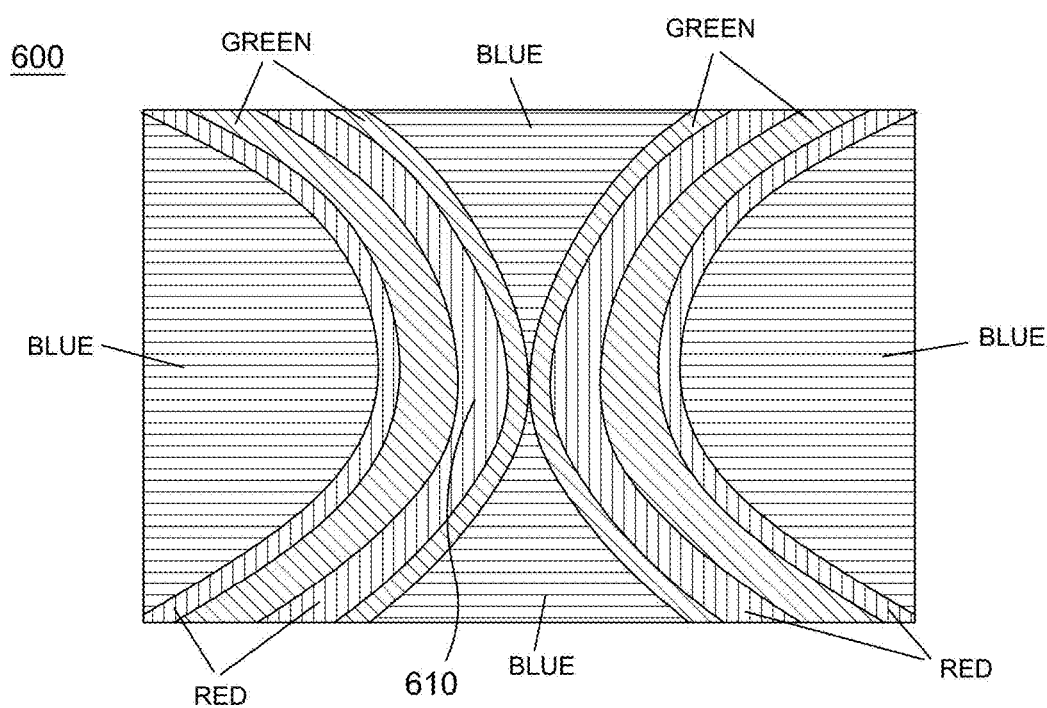
FIG. 6 shows a color pattern according to another embodiment of the present disclosure.

FIG. 6 shows a color pattern 600 according to an embodiment of the present disclosure. FIG. 6A is a color version of FIG. 6. The color pattern 600 may be the same as the color pattern 100 shown in FIG. 1 including a contiguous region 610 to which certain colors (e.g. skin-tone colors) are confined that is the same as the contiguous region 110 except that, in the case of the color pattern 600, the contiguous region 610 is a pair of curves that meet in the center of the color pattern 600. The use of curves rather than straight lines as in the example of FIG. 1 may have the further advantageous effect that the transition between colors of the color pattern 600 is less likely to be visible in the form of shadow artifacts in the film or photograph. For example, when using a color pattern 100 including straight lines separating the individual colors, there may be a tendency for such color pattern 100 to be visible as shadow artifacts where the colors used in the color pattern 100 can be seen as concentrated areas of colored shadow. When using a color pattern 600 including curved lines, such shadow artifacts disappear, making it easier to hide the source of light in the shot and, in particular, to hide the individual colors of the color pattern 600. Meanwhile, by providing the contiguous region 610 in the center and expanding outwards to the corners of the color pattern 600 as shown, it is still possible to achieve selective morphing/distortion of the subject's face as described above in relation to the color patterns 100, 500.

Figure 6B:
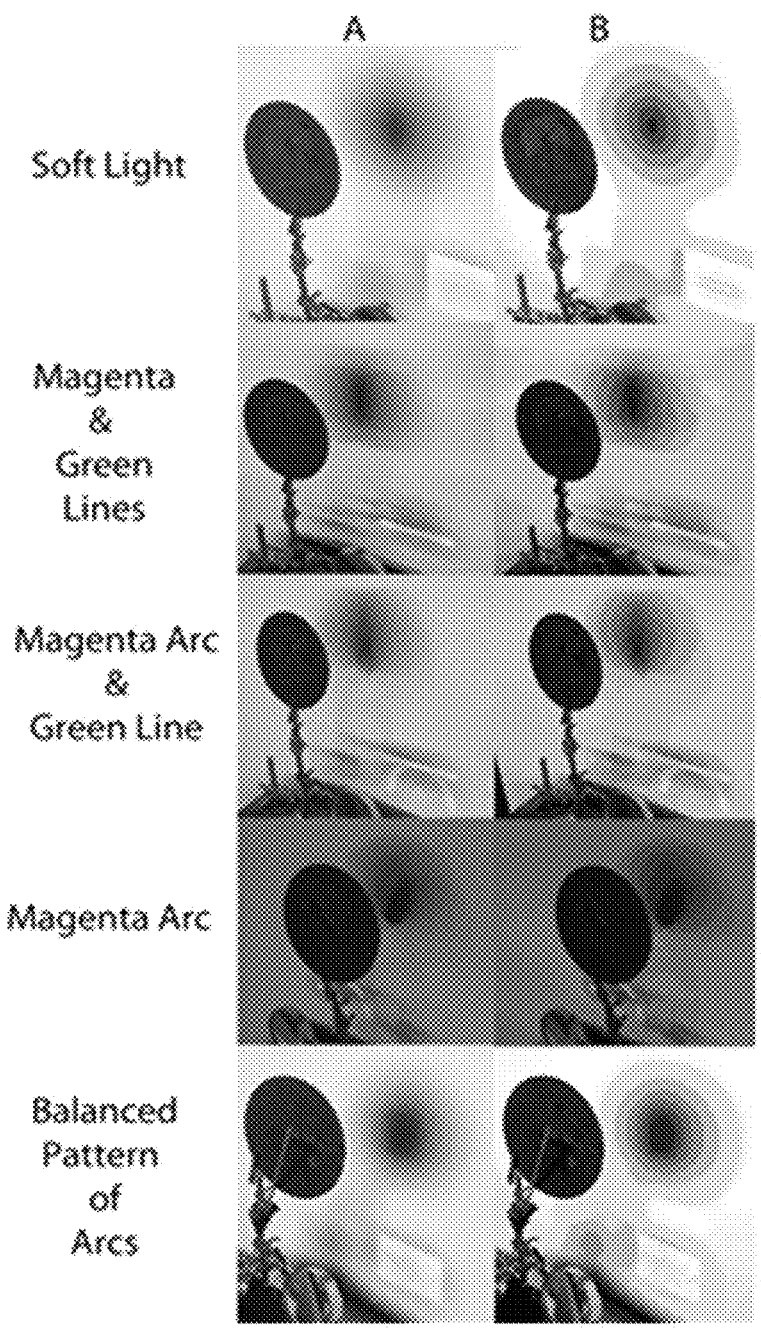
FIG. 6B is a series of color photographs illustrating the effect of using a color pattern of curved lines on the generation of shadow artifacts.

FIG. 6B is a series of color photographs (posterized in the right-hand column) illustrating the effect of using a color pattern of curved lines on the generation of shadow artifacts. The light source used is represented in the lower-right corner of each image. The top row is taken with a standard soft light casting a uniform shadow. The second row is illuminated with magenta and green horizontal lines. The third row introduces the concept of arc shapes, and it can be seen that the shadow from the magenta arc is more dispersed than the green line. In the fourth row, the magenta arc alone displays a unique shadow pattern that is more diffused. Finally, in the fifth (bottom) row is an example of a color pattern of red, green, and blue overlapping half-sine waves and arcs that produces white or gray by additive mixing. Although the colors in the pattern are very vibrant, the shadow characteristics of the overlapping curves allow the colors to mix in the shadow area and thus not betray the technology.

Figure 6C:
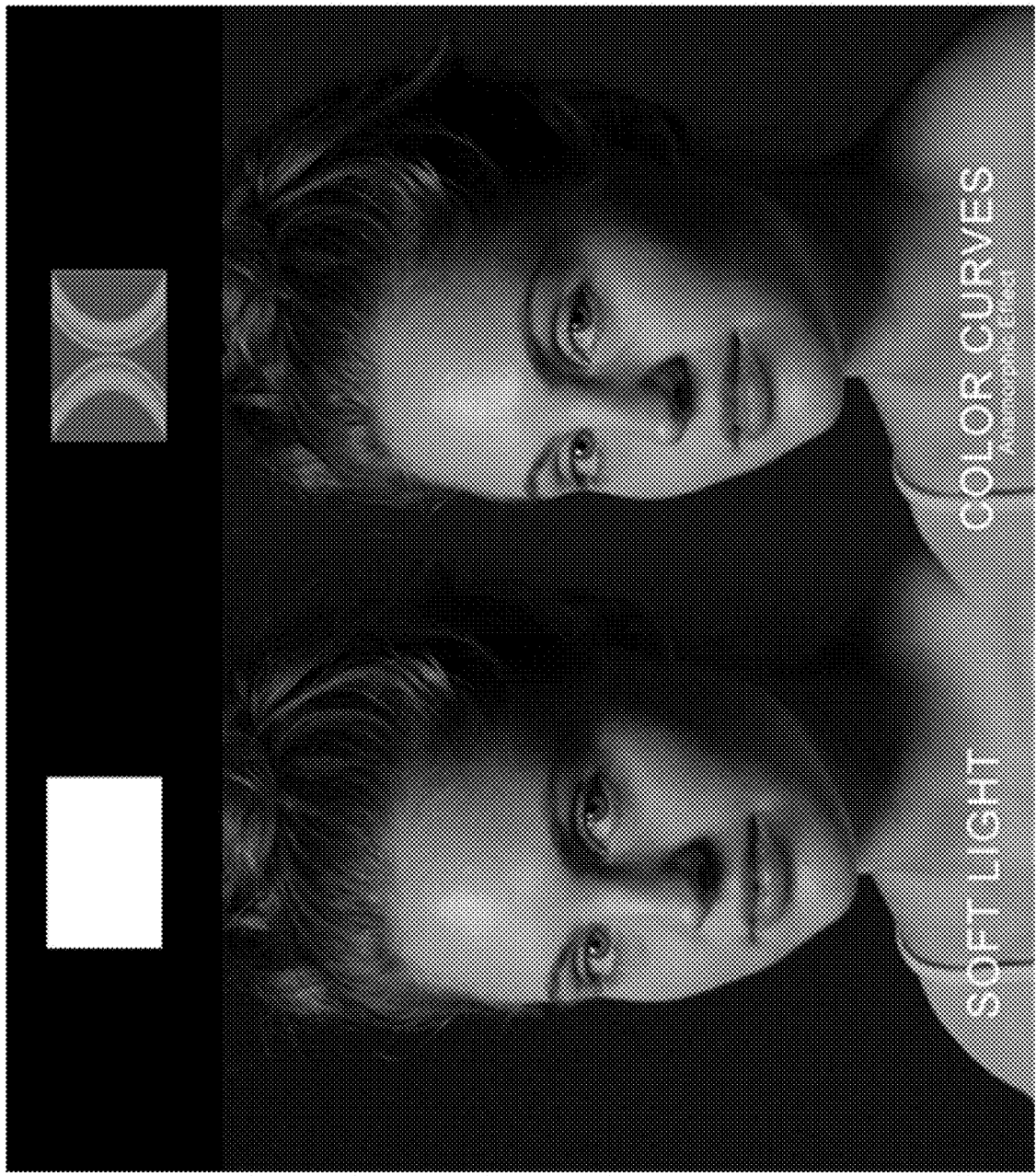
FIG. 6C shows a comparison between illumination of a subject using a solid white substrate (left-hand side of FIG. 6C) and illumination of the same subject using the color pattern of FIG. 6 (right-hand side of FIG. 6C).

FIG. 6C shows a comparison between illumination of a subject using a solid white light source (left-hand side of FIG. 6C) and illumination of the same subject using the color pattern 600 of FIG. 6 (right-hand side of FIG. 6C). As explained above with respect to FIG. 6B, by replacing the straight line dominant color pattern 100 of FIG. 1 with the color pattern 600 having mirrored curves that touch at the nodes (sometimes referred to as "kissing curves"), we can create a "thinning" effect on the face and also hide shadow artifacts.

Figure 7A:
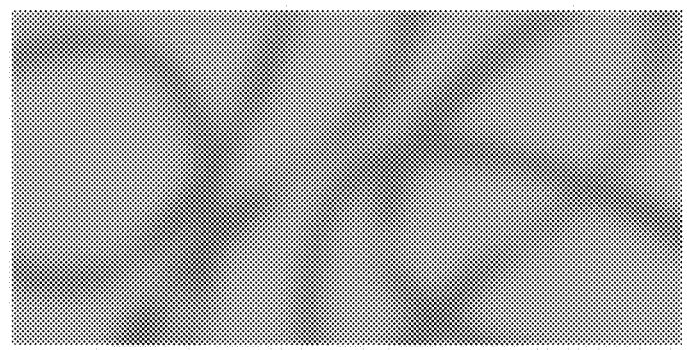
FIG. 7A is a color version of FIG. 7.
Figure 7:
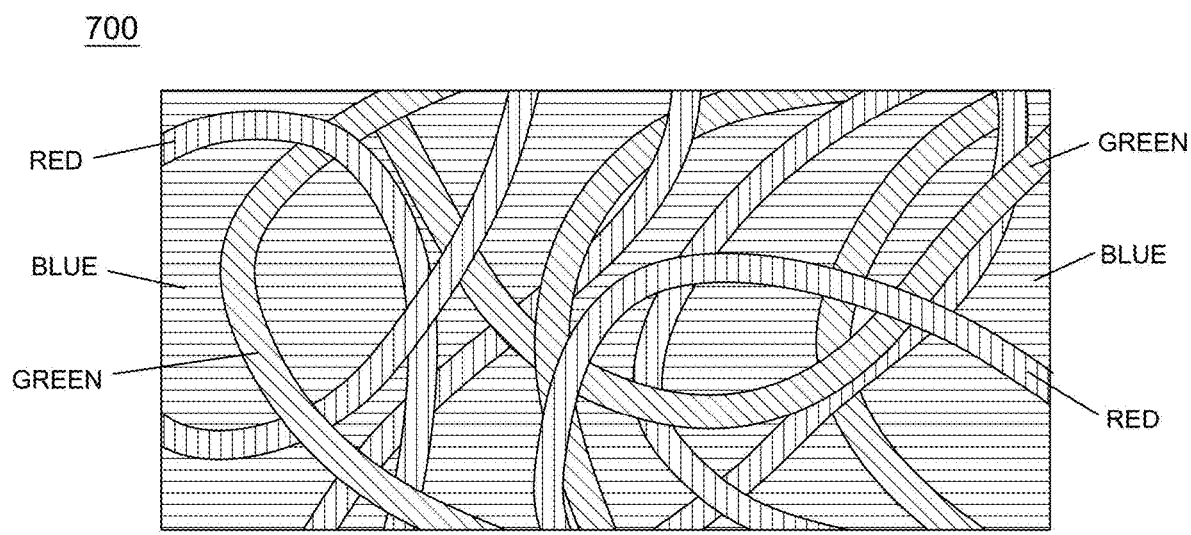
FIG. 7 shows a color pattern according to another embodiment of the present disclosure.

FIG. 7 shows a color pattern 700 according to an embodiment of the present disclosure. FIG. 7A is a color version of FIG. 7. The color pattern 700 is the same as the color pattern used in the bottom row of FIG. 6B. Like the color pattern 600, the color pattern 700 is made of curves (e.g. sinusoidal curves, Bezier curves, arcs, etc.). Also, like the color pattern 600 and the color pattern 100, the color pattern 700 is formed of a color pattern of two or more colors that produces white or gray by additive mixing, in this case red, green, and blue. The color pattern 700 differs from the color patterns 100, 500, 600 in that the red and green colors are disposed as a pattern of interweaving curves throughout the entire color pattern 700, with the blue color serving as a background. As such, the color pattern 700 may not provide the ability to selectively morph or distort the shape of a subject as in the case of the color patterns 100, 500, 600. However, because the color pattern 700 makes use of a first set of one or more colors (i.e. the red and green) each of whose hue is greater than or equal to 300 degrees or less than or equal to 120 degrees on a standard RGB color wheel and a second set of one or more colors (the blue) each of whose hue is between 120 degrees and 300 degrees, the color pattern 700 may nevertheless have the effect of enhancing 3-D cueing, while also softening facial features, hiding blemishes, etc. as described in U.S. Patent Application Pub. No. 2016/0147132.

A reason for such enhanced 3-D cueing may relate to the use of skin-tone hues and non-skin-tone hues as discussed above. Namely, between each of the curves of red and green in the example color pattern 700, there are relatively larger regions of blue that cast blue light on a subject's face. As noted above, it is possible to vary the total area of each color with the additive mixture of all the colors still having a saturation at or near zero, e.g. using neutral density pigments to lower the saturation of the larger color regions. Thus, as in the example of the color pattern 100, the color pattern 700 has a total area of blue that is greater than the total area of red and green. Meanwhile, because the subject's face is not flat, there are areas of relatively greater depth both small (e.g. pores, blemishes, etc.) and large (e.g. areas around eyes, under chin, etc.). In such areas, light rays of the non-skin-tone hue (blue in the example of FIG. 7) are more likely to be incident on the skin since the light rays of the skin-tone hues originate from more localized portions of the color pattern 700 and are more often blocked by the raised areas of skin around the deep areas. Thus, on average, the low-lying areas of the subject's face will receive a disproportionate share of blue rays (or other non-skin-tone rays). As described above, human skin is less reflective of such non-skin-tone hues, resulting in more shadow in these low areas of the person's face. This may result in enhanced 3-D cueing, making the three-dimensional shape of the subject's face more apparent when captured on film or in a photograph (where human stereoscopic vision cannot be used to discern depth).

Figure 7B:
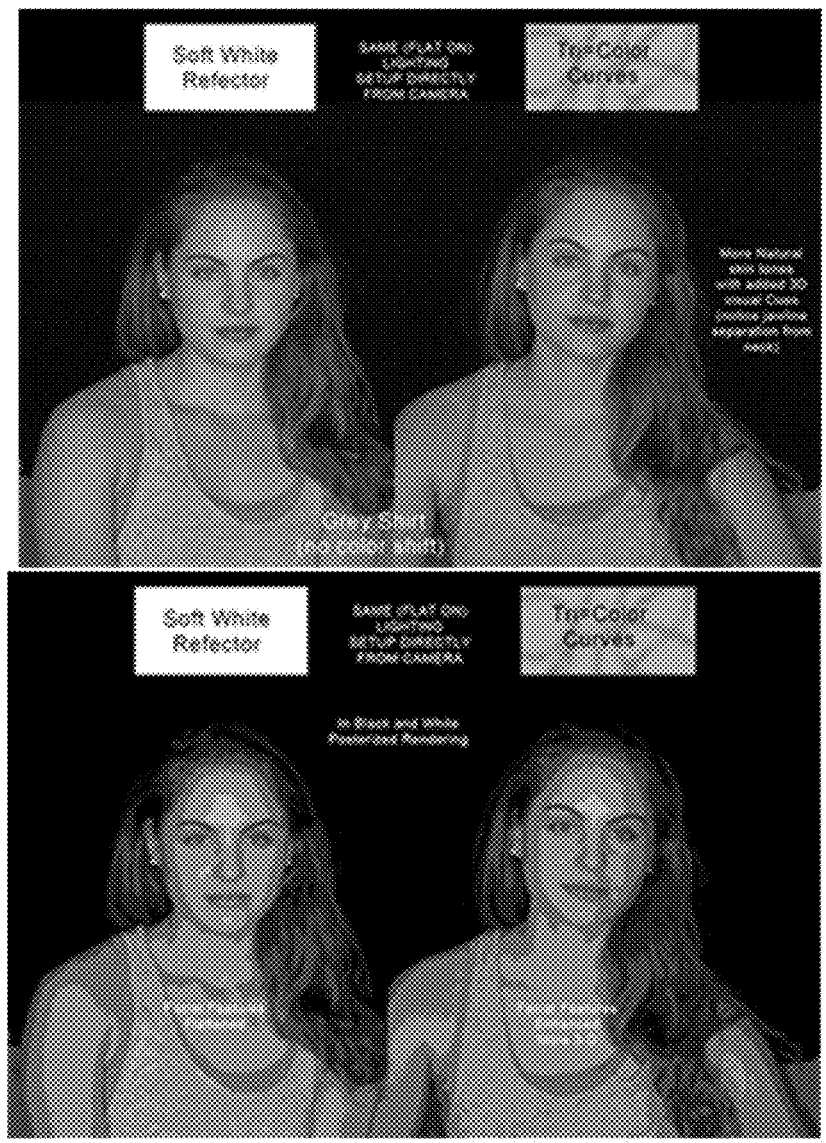
FIG. 7B shows, in the upper part, a comparison between illumination of a subject using a solid white substrate (left-hand side of FIG. 7B) and illumination of the same subject using the color pattern of FIG. 7 (right-hand side of FIG. 7B), and in the lower part, the same comparison after posterized rendering in black and white.

FIG. 7B shows, in the upper part, a comparison between illumination of a subject using a solid white light source (left-hand side of FIG. 7B) and illumination of the same subject using the color pattern 700 of FIG. 7 (right-hand side of FIG. 7B), and in the lower part, the same comparison after posterized rendering in black and white. In the example of FIG. 7B, the color pattern 700 is positioned directly at camera (like a ring light). As can be seen, the color pattern 700 enhances depths and causes an increase in 3-D cueing on the face (as opposed to the flattening effect of white light alone), without being designed to change the shape of the face. For example, the jawline appears to be more separated from the neck when the color pattern 700 is used. Probe analysis of the photos reveals that the highlights and shadows are of equal value while the curves of the face are accentuated. The enhanced 3-D cueing is more apparent in the isophotes of the black and white posterized version (bottom of FIG. 7B). As shown by the isophotes, the illumination boundaries are spread more evenly over the curves of the face, minimizing the flat look associated with ring lights. Meanwhile, due to the additive mixture of the colors having a saturation at or near zero, the effect of the color pattern 700 on the gray shirt of the subject is negligible with no discernible color shift, despite the fact that the color pattern 100 consists of non-white colors.

Figure 7C:
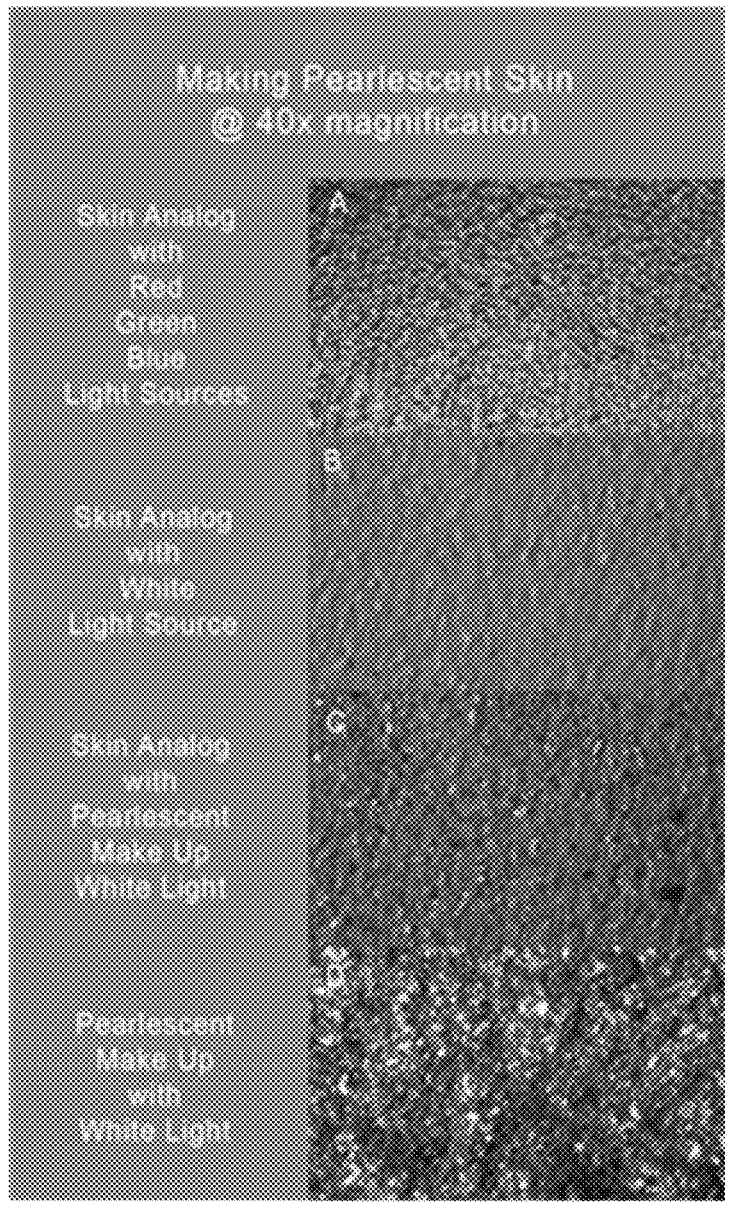
FIG. 7C shows, in a series of four 40× magnification photographs from top to bottom, a flesh-toned human skin analogue illuminated by the color pattern of FIG. 7, the same skin analogue illuminated with white light, the same skin analogue illuminated with white light after pearlescent makeup is applied to the skin analogue, and the pearlescent makeup by itself illuminated with white light.

FIG. 7C shows, in a series of four 40× magnification photographs from top to bottom, a flesh-toned human skin analogue illuminated by the color pattern of FIG. 7, the same skin analogue illuminated with white light, the same skin analogue illuminated with white light after pearlescent makeup is applied to the skin analogue, and the pearlescent makeup by itself illuminated with white light. Healthy human skin, especially young skin, is often described as "pearlescent." This refers to the light scattering that happens often in nature with the specular highlights of healthy skin. Manufacturers of makeup products often combine microcrystalline particles (such as mica) at different sizes on the order of nanometers to aid in refracting the ambient white light into different colors and to impart an illusion of greater depth through pearlescence. The effect of such pearlescent makeup can be seen by comparison of the third photograph of FIG. 7C with the second, where the use of pearlescent makeup on the skin analogue causes incident white light to reflect in various colors including red and green that are not as apparent without the makeup. As shown in the first photograph of FIG. 7C, the disclosed color patterns can mimic the nanometer-sized light-refracting crystals of pearlescent makeup and achieve the same effect through organic means, as tiny variations in the texture of the skin analogue block individual colors or subcombinations of colors of the color pattern, allowing the colors of the color pattern to reflect individually on a microscopic scale.

Figure 7D:
FIG. 7D shows a comparison between illumination of a subject using a solid white substrate (bottom part of FIG. 7D) and illumination of the same subject using the color pattern of FIG. 7 (top part of FIG. 7D).

FIG. 7D shows a comparison between illumination of a subject using a solid white light source (bottom part of FIG. 7D) and illumination of the same subject using the color pattern of FIG. 7 (top part of FIG. 7D). As can be seen, there is an enhanced pearlescent quality in addition to enhancement of 3-D cuing and diminishing of small skin imperfections and blemishes as described above.

Figure 8A:
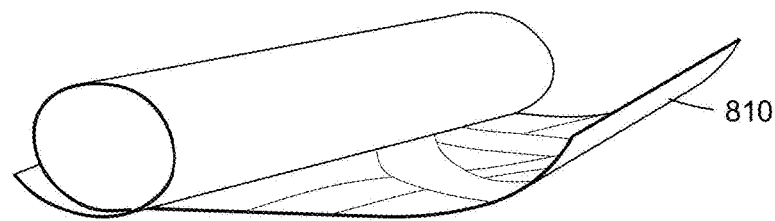
FIGS. 8A-8G show example implementations of color patterns such as the color patterns of FIGS. 1, 5, 6, and 7 in accordance with embodiments of the present disclosure, with FIG. 8A showing an example in which a color pattern like the color pattern of FIG. 7 is printed on a substrate, FIG. 8B showing an example in which a color pattern like the color pattern of FIG. 7 is printed on a substrate and fixed to a light source to be used as a transmissive medium, FIG. 8C showing another example in which a color pattern like the color pattern of FIG. 7 is printed on a substrate and fixed to a light source to be used as a transmissive medium, FIG. 8D showing an example in which a color pattern like the color pattern of FIG. 6 is formed on a liquid crystal display screen, FIG. 8E showing another example in which a color pattern like the color pattern of FIG. 7 is printed on a substrate, and FIG. 8F showing another example in which a color pattern like the color pattern of FIG. 7 is printed on a substrate and fixed to a light source to be used as a transmissive medium.

FIGS. 8A-8G show example implementations of color patterns such as the color patterns 100, 500, 600, 700 in accordance with embodiments of the present disclosure. FIG. 8H is a color version of FIGS. 8A-8E, and FIG. 8I is a color version of FIG. 8F. FIG. 8A shows an example in which a color pattern like the color pattern 700 of FIG. 7 is printed on a substrate 810, which may be for example, a sheet of paper or textile. Such a substrate 810 may be used, for example, as a reflective medium such as a bounce board or as a transmissive medium such as a filter. Printing can be done using existing dyes, pigments, thin metal depositing, and/or organic and/or synthetic particles and nanoparticles (using light wave interference) to achieve desired hues. For example, nanometer sized particles suspended in clear lacquer may be used to create color hues while also exhibiting iridescent properties to deter counterfeiting. As another example, in the case of a transmissive medium such as a filter, printing may include vacuum metal deposition to create a dichroic optical filter.

Figure 8B:
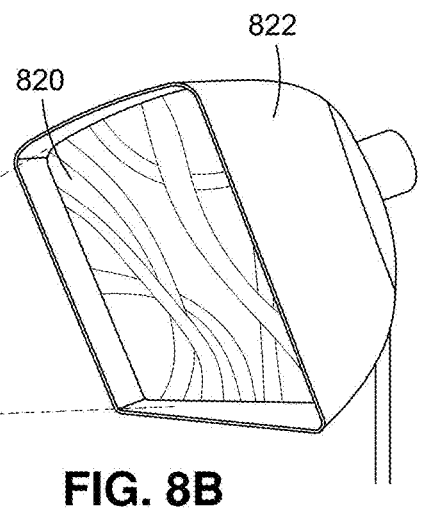

FIG. 8B shows an example in which a color pattern like the color pattern 700 of FIG. 7 is printed on a substrate 820 (e.g. a sheet of paper or textile or other printing substrate as described above) and fixed to a light source 822 to be used as a transmissive medium. In the case of FIG. 8B, the light source 920 is an existing soft light.

Figure 8C:
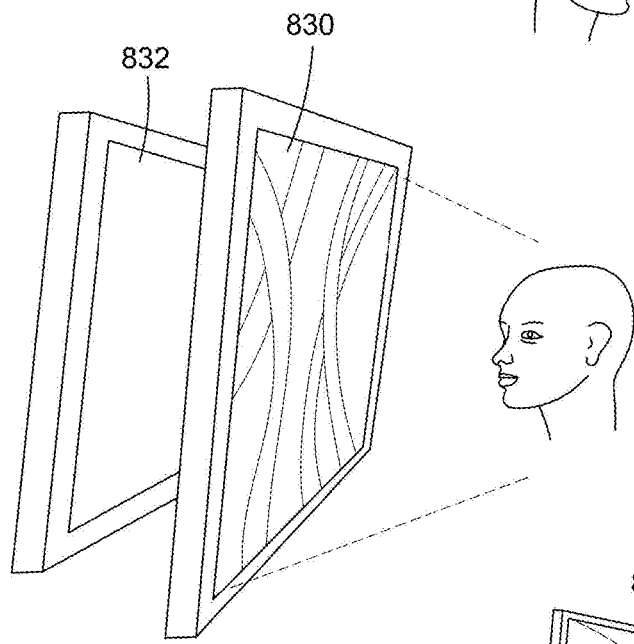

FIG. 8C shows another example in which a color pattern like the color pattern 700 of FIG. 7 is printed on a substrate 830 (e.g. a sheet of paper or textile or other printing substrate as described above) and fixed to a light source 930 to be used as a transmissive medium. In the case of FIG. 8C, the light source 930 is a color-balanced LED panel emitting a white light that is produced from a combination of red, green, and blue LEDs.

Figure 8D:
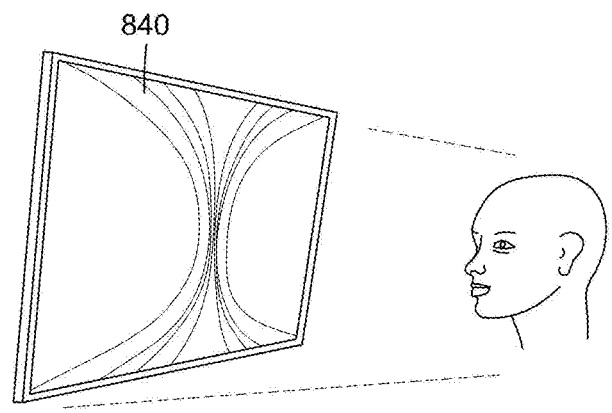

FIG. 8D shows an example in which a color pattern like the color pattern 600 of FIG. 6 is formed on a liquid crystal display screen 840 such as a computer monitor, in which case the liquid crystal display screen may be considered a transmissive medium with respect to a white backlight (the white backlight may itself be produced from a combination of red, green, and blue LEDs). The color pattern may be formed on the liquid crystal display screen 840 by selective transmission of light from the backlight through red, green, and blue color filters of the liquid crystal display screen 840.

Figure 8E:
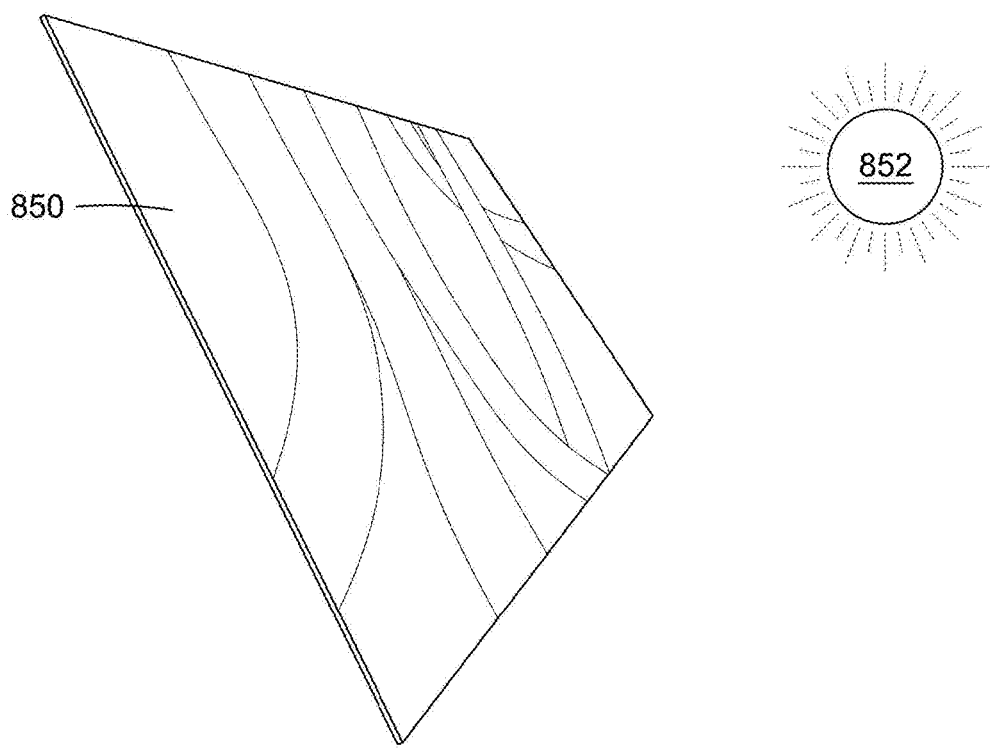

FIG. 8E shows another example in which a color pattern like the color pattern 700 of FIG. 7 is printed on a substrate 850 (e.g. a sheet of paper or textile or other printing substrate as described above). In the example of FIG. 8E, the substrate 850 is used as a reflective medium to be illuminated by an external light source 950, in this case the sun.

Figures 8F, 8G:
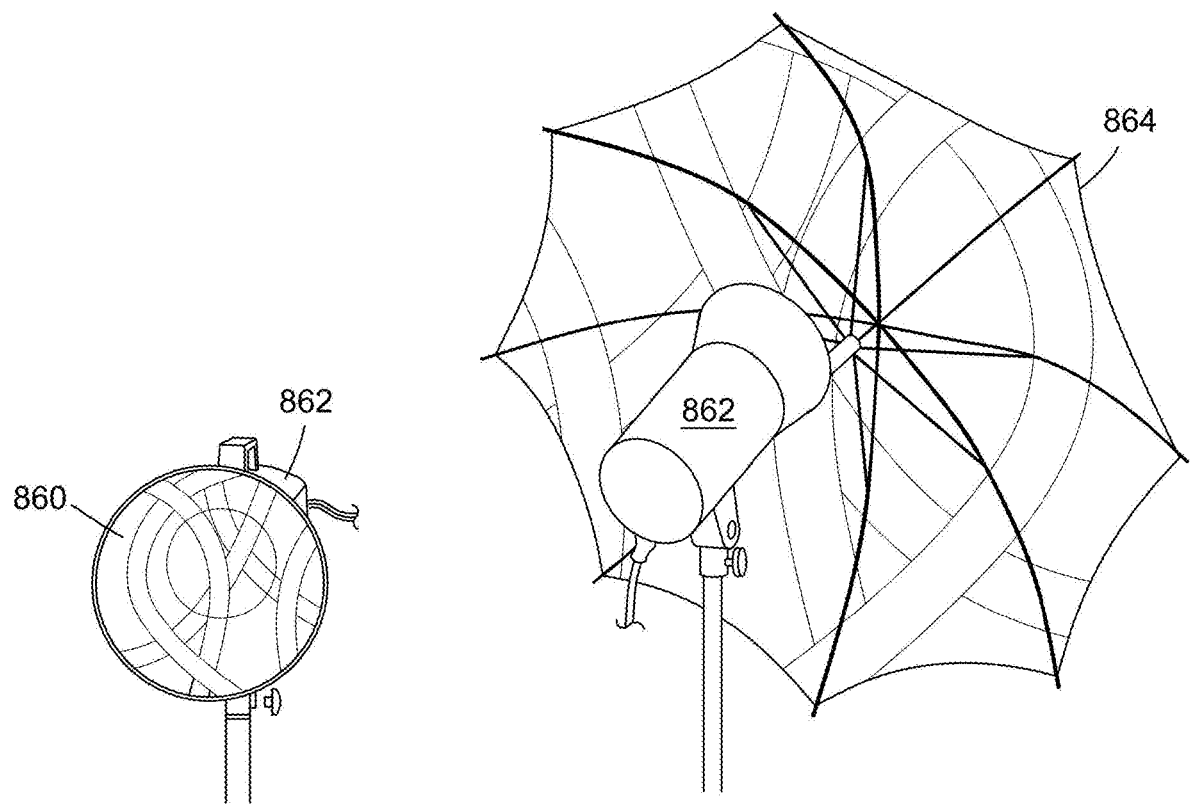
Figure 8H:
FIG. 8H is a color version of FIGS. 8A-8E.
Figure 8I:
FIG. 8I is a color version of FIG. 8F.

FIG. 8F shows another example in which a color pattern like the color pattern 700 of FIG. 7 is printed on a substrate 860 and fixed to a light source 960 to be used as a transmissive medium. In the example of FIG. 8F, the substrate 860 is a glass or plastic lens and the color pattern may be printed on the lens by various techniques including heat resistant dyes or dimultiple dielectric, metal and color filter arrays on a single substrate. In the case of FIG. 8F, the light source 960 is a strobe for still photography. An umbrella reflector 962 is positioned to reflect the light transmitted by the substrate 860 to cast the light upon a subject. The umbrella reflector 962 may be covered with reflective or diffusion material and may create a very soft and defused light. It is further contemplated that lenses such as the substrate 860 may be used on any lighting instrument to illuminate a bounce lighting substrate (e.g. card stock, foam core, stretched muslin, etc.) to project the color pattern.

The various substrates 810, 820, 830, 850, 860 described above may be polarized or have areas of polarizing coatings that work in coordination with the visible colors of the pattern. For example, areas of the substrate 810, 820, 830, 850, 860 may be coated with polarizing crystals to work in tandem with the color pattern.

The color patterns described throughout this disclosure, including the color patterns 100, 500, 600, and 700 may be produced using a variety of methodologies. For example, such color patterns may be produced using an iterative trial-and-error process of adding paint, dye, or other pigment and measuring the intermediate result with a color analyzer such as a densitometer or spectrophotometer. For example, if there is too much of one hue, other hues (e.g. a complementary hue) may be added so that the additive mixture of all the colors has a saturation at or near zero. As another example, either in producing a color pattern formed on a liquid crystal display screen 840 (as in the example of FIG. 8D) or in a design stage of a printed color pattern (e.g. those of FIGS. 8A-8C and 8E-8G), a software application such as Adobe® Photoshop® may be used to generate the color pattern. As colors are added and removed using such a software application, a hue averaging tool of the software application may be used to check whether the additive mixture of all the colors has a saturation at or near zero.

The color patterns described throughout this disclosure are not limited to patterns of arbitrary shapes and colors. Depending on the scene of a particular film or photography shoot, a color pattern may be used that evokes organic shapes and colors (e.g. trees, rocks, leaves) architectural shapes and colors (e.g. windows, columns, doorways), etc. For example, FIG. 9 (color only) shows an example color pattern that is intended to evoke a New York flat or other apartment setting. While it looks like an out-of-focus photograph, the color pattern is actually a matte painting of colors that produces gray by additive mixing. As such, the color pattern, like the other color patterns described throughout this disclosure, may be used to accurately illuminate a subject without creating an unwanted color cast. At the same time, the color pattern may have the additional effect of softening facial features as described above. By virtue of the use of architectural shapes reminiscent of an apartment setting, the color pattern may be used with no need to worry that the color pattern might be seen in the shot as a shadow artifact or as a reflection in a reflective surface such as a wine glass or television screen. The color pattern may indeed be seen, but it appears natural and does not have the jarring effect that revealing the source of light may otherwise have. In fact, the color pattern may even be placed directly in the shot and used as a backdrop, creating a vague suggestion of an out-of-focus setting in addition to the advantageous lighting effects described herein. This is demonstrated in FIG. 10, which shows three photographs of a subject illuminated using the color pattern of FIG. 9 with the color pattern of FIG. 9 also serving as a backdrop for the photographs. As can be seen, even though the wine glass reflects the color pattern, it does not create an unnatural effect as the color pattern itself is designed to look like a natural apartment setting.

Figure 11:
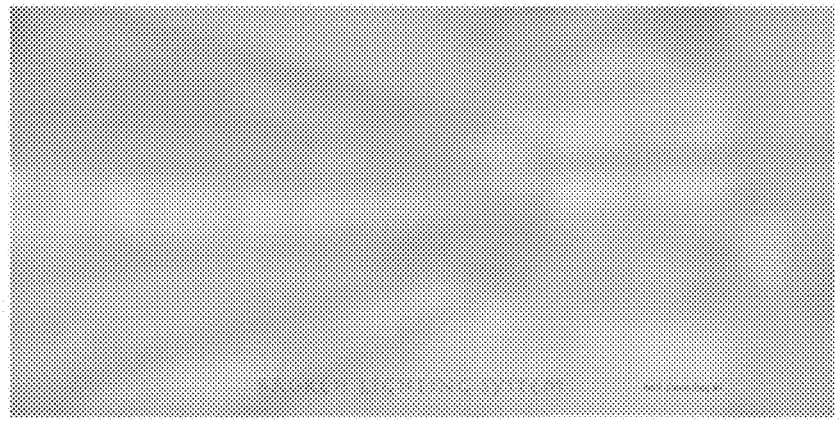
FIG. 11 shows another example color pattern of architectural shapes and colors.

FIG. 11 shows another example color pattern of architectural shapes and colors. The color pattern of FIG. 11 is intended to evoke a morning cabin or other rustic indoor setting. The colors used are the hues of common color-correction filters (Color Temperature Orange and Booster Blue), conventionally used to raise or lower the color temperature of lighting instruments. As in the case of the color pattern of FIG. 9, the color pattern produces gray by additive mixing while having the additional effect of softening facial features as described above and without revealing the source of light.

Figure 9:
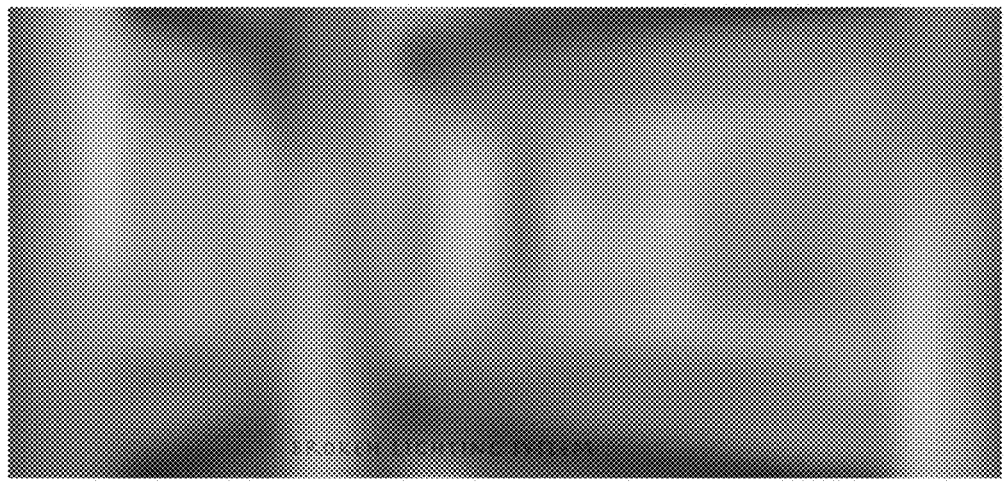
FIG. 9 shows an example color pattern of architectural shapes and colors.
Figure 12:
FIG. 12 shows an example color pattern of organic shapes and colors.
Figure 13:
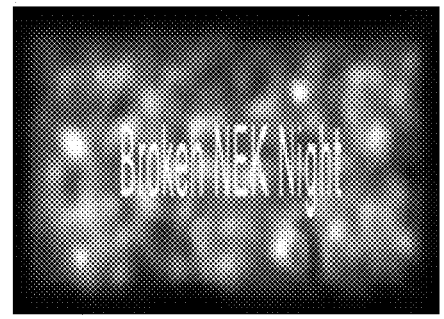
FIG. 13 shows another example color pattern of organic shapes and colors.
Figure 10:
FIG. 10 shows three photographs in which a subject is illuminated using the color pattern of FIG. 9 with the color pattern of FIG. 9 also serving as a backdrop for the photographs.

FIGS. 12 and 13 show example color patterns of organic shapes and colors rather than architectural shapes and colors Like the color patterns of FIGS. 9 and 10, these color patterns produce gray by additive mixing while having the additional effect of softening facial features as described above and without revealing the source of light. The color patterns of FIGS. 12 and 13 evoke outdoor settings such as a forest or garden. FIG. 13 includes a vignette, evoking a nighttime setting and making the color pattern more usable as a key light source while still hiding the border of the color pattern.

As described above, the various color patterns described herein may have the property that the additive mixture of all the colors has a saturation at or near zero. However, the disclosure is not intended to be so limited. It is also contemplated, for example, that there may be situations where a photographer wants to impart a non-standard colorcast (e.g. when photographing a subject in the rain or under open shade). To this end, the balance of the colors in the color patterns described herein may be adjusted so that the additive mixture of all the colors does not equal white or gray but equals some other specific colorcast. The selected colors could use existing color-correction values according to conventional photographic terminology so that they are easily integrated into the photographic process.

It is further contemplated, in addition to the additive mixtures of all the colors of a given color pattern having saturation at or near zero (or producing a specific colorcast), that the additive mixture of the colors in a particular region of the color pattern similarly have a saturation at or near zero (or produce a specific colorcast). For example, a color pattern may be divided into quadrants or any other divisions, each of which exhibits the property that the additive mixture of colors within the division has a saturation at or near zero. In this way, even as the subject moves nearer to the color pattern, the light reflected or transmitted by the color pattern and cast upon the subject may still produce the desired effect.

As noted above, the color patterns described throughout this disclosure can be used in various ways, including in the context of both reflective and transmissive media for casting light on a subject. In this regard, it should be noted that the color patterns may be used for key lighting, fill lighting, back lighting, and even in some cases as a backdrop as noted above. For example, the color patterns 100, 600 may be well suited for key lighting as the color pattern 100, 600 may be positioned to create the desired distortion of a subject's face.

In the above examples of the color patterns 100, 600, 700, three colors are used. However, combinations of four or more colors may also be used, with the color pattern still producing white or gray by additive mixing.

As described above, the shape, size, and position of a contiguous region 110, 510, 610 (where certain colors such as skin-tone colors may be confined as described above) can be chosen to selectively morph or distort the shape of a subject. In this regard, it should be noted that the straight vertical/horizontal line and T-shaped contiguous regions 110, 510, as well as the "kissing curves" 610, are only examples, and that H-shaped regions and rotated and/or curved variants are contemplated as well, including arbitrary shapes determined in accordance with a particular subject, angle, and lighting situation. Along the same lines, the disclosure is also not intended to be limited to the use of a single continuous region, but also contemplates color patterns having two or more such regions in which specific skin-tone colors may be confined.

As described above with respect to selective morphing of a subject, the total area of blue or other non-skin tone in a color pattern may be greater than the total area of skin-tones, with the color saturations selected (e.g. using neutral density pigments to lower saturation) such that, when considering the entire color pattern, the saturation is still at or near zero. Such an arrangement may have the further advantageous effect that non-skin tones such as blue are made softer and more diffused, resulting in less penetration of transmitted or reflected light of that color into the skin of the subject. Since such non-skin tones, especially blue, are often associated with facial imperfections such as visible veins, softening this part of the spectrum may help to hide such imperfections.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of casting light upon a subject to be filmed or photographed, the method comprising:
    providing a reflective or transmissive medium on which is formed a color pattern of two or more colors that produces white or gray by additive mixing, the color pattern consisting of a first set of one or more colors each of whose hue is greater than or equal to 300 degrees or less than or equal to 120 degrees on a standard RGB color wheel and a second set of one or more colors each of whose hue is between 120 degrees and 300 degrees, the first set of one or more colors confined to a contiguous region of the color pattern that makes up 50% or less of the color pattern by area; and
    positioning the medium relative to a light source and the subject such that light from the light source incident on the medium is reflected or transmitted by the medium and cast upon the subject,
    wherein the contiguous region of the color pattern is i) a vertical stripe in a center of the color pattern, ii) a T-shaped region including a horizontal stripe extending along an edge of the color pattern and a vertical stripe extending along a center of the color pattern, or iii) a pair of curves that meet in a center of the color pattern.

2. The method of claim 1 wherein the contiguous region of the color pattern makes up 25% or less of the color pattern by area.

3. The method of claim 2 wherein the contiguous region of the color pattern is a vertical stripe in a center of the color pattern.

4. The method of claim 1 wherein the contiguous region of the color pattern is a vertical stripe in a center of the color pattern.

5. The method of claim 1 wherein the contiguous region of the color pattern is a T-shaped region including a horizontal stripe extending along an edge of the color pattern and a vertical stripe extending along a center of the color pattern.

6. The method of claim 1 wherein the contiguous region of the color pattern is a pair of curves that meet in a center of the color pattern.

7. The method of claim 1 wherein the first set of one or more colors includes two colors whose hues are separated by 60 degrees or more.

8. The method of claim 7 wherein the two colors of the first set of one or more colors are arranged in an alternating pattern.

9. The method of claim 7 wherein the hues of the two colors of the first set of one or more colors are separated by 90 degrees or more.

10. The method of claim 9 wherein the two colors of the first set of one or more colors are arranged in an alternating pattern.

11. The method of claim 9 wherein the hues of the two colors of the first set of one or more colors are separated by 120 degrees or more.

12. The method of claim 11 wherein the two colors of the first set of one or more colors are arranged in an alternating pattern.

13. The method of claim 1 wherein the reflective or transmissive medium is a substrate and the color pattern is formed on the substrate by printing.

14. The method of claim 13 wherein said positioning includes fixing the substrate to the light source, and the light from the light source incident on the substrate is transmitted by the substrate.

15. The method of claim 14 further comprising positioning an umbrella reflector to reflect the light transmitted by the substrate to cast the light upon the subject.

16. The method of claim 13 wherein the light source is the sun.

17. The method of claim 1 wherein the reflective or transmissive medium is a liquid crystal display screen and the color pattern is formed on the liquid crystal display screen by selective transmission of light through red, green, and blue color filters of the liquid crystal display screen.

18. A lighting system for casting light upon a subject to be filmed or photographed comprising:
a transmissive substrate on which is printed a color pattern of two or more colors that produces white or gray by additive mixing, the color pattern consisting of a first set of one or more colors each of whose hue is greater than or equal to 300 degrees or less than or equal to 120 degrees on a standard RGB color wheel and a second set of one or more colors each of whose hue is between 120 degrees and 300 degrees, the first set of one or more colors confined to a contiguous region of the color pattern that makes up 50% or less of the color pattern by area; and
a light source to which the substrate is fixed, the light source positioned relative to the substrate and the subject such that light from the light source incident on the substrate is transmitted by the substrate and cast upon the subject.

19. The lighting system of claim 18, further comprising an umbrella reflector positioned to reflect the light transmitted by the substrate to cast the light upon the subject.

20. A reflective or transmissive medium on which is formed a color pattern of two or more colors that produces white or gray by additive mixing, the color pattern consisting of a first set of one or more colors each of whose hue is greater than or equal to 300 degrees or less than or equal to 120 degrees on a standard RGB color wheel and a second set of one or more colors each of whose hue is between 120 degrees and 300 degrees, the first set of one or more colors confined to a contiguous region of the color pattern that makes up 50% or less of the color pattern by are; wherein the contiguous region of the color pattern is i) a vertical stripe in a center of the color pattern, ii) a T-shaped region including a horizontal stripe extending along an edge of the color pattern and a vertical stripe extending along a center of the color pattern, or iii) a pair of curves that meet in a center of the color pattern.

21. The reflective or transmissive medium of claim 20 wherein the contiguous region of the color pattern makes up 25% or less of the color pattern by area.

22. The reflective or transmissive medium of claim 20 wherein the contiguous region of the color pattern is a vertical stripe in a center of the color pattern.

23. The reflective or transmissive medium of claim 20 wherein the contiguous region of the color pattern is a T-shaped region including a horizontal stripe extending along an edge of the color pattern and a vertical stripe extending along a center of the color pattern.

24. The reflective or transmissive medium of claim 20 wherein the contiguous region of the color pattern is a pair of curves that meet in a center of the color pattern.

25. A lighting system for casting light upon a subject to be filmed or photographed, comprising:
the reflective or transmissive medium of claim 20; and
a light source positioned relative to the medium and the subject such that light from the light source incident on the medium is reflected or transmitted by the medium and cast upon the subject.

26. A method of casting light upon a subject to be filmed or photographed, the method comprising:
providing a reflective or transmissive medium on which is formed a color pattern of two or more colors that produces white or gray by additive mixing, the color pattern consisting of a first set of one or more colors each of whose hue is greater than or equal to 300 degrees or less than or equal to 120 degrees on a standard RGB color wheel and a second set of one or more colors each of whose hue is between 120 degrees and 300 degrees, the first set of one or more colors confined to a contiguous region of the color pattern that makes up 50% or less of the color pattern by area; and
positioning the medium relative to a light source and the subject such that light from the light source incident on the medium is reflected or transmitted by the medium and cast upon the subject,
wherein the reflective or transmissive medium is a substrate and the color pattern is formed on the substrate by printing, and
said positioning includes fixing the substrate to the light source, and the light from the light source incident on the substrate is transmitted by the substrate.

27. The method of claim 26 further comprising positioning an umbrella reflector to reflect the light transmitted by the substrate to cast the light upon the subject.

* * * * *